United States Patent
Lindström et al.

(10) Patent No.: US 10,239,513 B2
(45) Date of Patent: Mar. 26, 2019

(54) METHOD FOR GEAR SHIFTING IN A HYBRID VEHICLE

(71) Applicant: Scania CV AB, Södertälje (SE)

(72) Inventors: Johan Lindström, Nyköping (SE); Mathias Björkman, Tullinge (SE); Mikael Bergquist, Huddinge (SE); Niklas Pettersson, Stockholm (SE)

(73) Assignee: Scania CV Ab, Södertälje (SE)

( * ) Notice: Subject to any disclaimer, the term of this patent is extended or adjusted under 35 U.S.C. 154(b) by 0 days.

(21) Appl. No.: 15/735,077

(22) PCT Filed: Jun. 15, 2016

(86) PCT No.: PCT/SE2016/050581
§ 371 (c)(1),
(2) Date: Dec. 8, 2017

(87) PCT Pub. No.: WO2016/204680
PCT Pub. Date: Dec. 22, 2016

(65) Prior Publication Data
US 2018/0326971 A1    Nov. 15, 2018

(30) Foreign Application Priority Data

Jun. 17, 2015 (SE) ...................................... 1550844

(51) Int. Cl.
*B60K 6/48* (2007.10)
*B60W 20/15* (2016.01)
(Continued)

(52) U.S. Cl.
CPC ............. *B60W 20/15* (2016.01); *B60K 6/365* (2013.01); *B60K 6/40* (2013.01); *B60K 6/445* (2013.01);
(Continued)

(58) Field of Classification Search
CPC ... B60K 6/48; B60K 1/02; B60K 6/40; B60K 6/547; F16H 3/08; F16H 61/04; B60W 10/02; B60W 10/06
(Continued)

(56) References Cited

U.S. PATENT DOCUMENTS

| | | |
|---|---|---|
| 6,886,648 B1 | 5/2005 | Hata et al. |
| 8,241,174 B2 * | 8/2012 | Wallner ................ B60K 6/365 477/5 |

(Continued)

FOREIGN PATENT DOCUMENTS

| | | |
|---|---|---|
| DE | 102007004458 A1 | 7/2008 |
| EP | 1319546 A1 | 6/2003 |

(Continued)

OTHER PUBLICATIONS

International Search Report for PCT/SE2016/050580 dated Sep. 1, 2016.

(Continued)

*Primary Examiner* — Tan Q Nguyen
(74) *Attorney, Agent, or Firm* — Moore & Van Allen PLLC; W. Kevin Ransom

(57) ABSTRACT

A method for obtaining gear shifting of a vehicle, where the vehicle has a planetary gearing in the drive train, a combustion engine with an output shaft connected to a rotor of a second electric machine and to a first component of the planetary gearing, a first electric machine with a rotor connected to a third component of the planetary gearing and an input shaft of a gearbox connected to a second component of the planetary gearing. The method is started with the components of the planetary gearing interlocked by a locking means, in which they are released during the gear shifting and interlocked again after the gear shifting has been carried out.

12 Claims, 8 Drawing Sheets

(51) Int. Cl.
 B60K 6/547 (2007.10)
 B60K 6/40 (2007.10)
 B60K 6/445 (2007.10)
 B60W 10/06 (2006.01)
 B60W 10/08 (2006.01)
 B60W 10/115 (2012.01)
 B60W 30/19 (2012.01)
 B60W 30/18 (2012.01)
 B60K 6/365 (2007.10)
 F16H 3/08 (2006.01)

(52) U.S. Cl.
 CPC ............. *B60K 6/547* (2013.01); *B60W 10/06* (2013.01); *B60W 10/08* (2013.01); *B60W 10/115* (2013.01); *B60W 30/18127* (2013.01); *B60W 30/18136* (2013.01); *B60W 30/19* (2013.01); *B60W 2510/1015* (2013.01); *B60W 2510/1025* (2013.01); *B60W 2710/0627* (2013.01); *B60W 2710/0633* (2013.01); *B60W 2710/0638* (2013.01); *B60W 2710/0644* (2013.01); *B60W 2710/0666* (2013.01); *B60W 2710/083* (2013.01); *B60W 2710/1005* (2013.01); *B60W 2710/1011* (2013.01); *B60W 2710/1022* (2013.01); *B60Y 2200/92* (2013.01)

(58) Field of Classification Search
 USPC .......................................................... 701/22
 See application file for complete search history.

(56) References Cited

U.S. PATENT DOCUMENTS

2002/0045507 A1    4/2002   Bowen
2009/0250278 A1*   10/2009   Kawasaki ................ B60K 1/02
                                                                 180/65.275
2017/0349038 A1*   12/2017   Shinohara ................ B60K 1/02

FOREIGN PATENT DOCUMENTS

SE            536329 A1    6/2012
WO    2014158076 A1   10/2014

OTHER PUBLICATIONS

Written Opinion of the International Searching Authority for PCT/SE2016/050580 dated Sep. 1, 2016.

* cited by examiner

METHOD FOR GEAR SHIFTING IN A HYBRID VEHICLE

CROSS-REFERENCE TO RELATED APPLICATION(S)

This application is a national stage application (filed under 35 § U.S.C. 371) of PCT/SE2016/050581, filed Jun. 15, 2016 of the same title, which, in turn claims priority to Swedish Application No. 1550844-3, filed Jun. 17, 2015 of the same title; the contents of each of which are hereby incorporated by reference.

FIELD OF THE INVENTION

The present invention relates to a method for controlling gear shifting in a vehicle. The invention is especially but not exclusively directed to such a method carried out for motor vehicles in the form of wheeled utility motor vehicles, especially heavy such vehicles, such as trucks and buses.

BACKGROUND OF THE INVENTION

A drive system of the type to which the method according to the present invention is directed is known through for example EP 1 319 546 and SE 536 329. Although a number of advantageous methods for controlling a vehicle having a drive system of the type disclosed in SE 536 329 are known, there is of course an ongoing attempt to improve methods to control such vehicles, especially in certain situations.

SUMMARY OF THE INVENTION

The invention relates to a method carried out for a hybrid vehicle, which is generally speaking a vehicle which may be driven by a primary engine, here a combustion engine, and a secondary engine, here said first electric machine. The vehicle is suitably provided with means for storing electric energy, such as electric batteries or a capacitor for storing electric energy, and equipment for regulating the flow of electric energy between said means and the electric machine. The electric machine may then through exchange of electric energy with said means alternatively operate as motor and generator depending upon the state of operation of the vehicle. When braking the vehicle the electric machine generates electric energy which may be stored, and the electric energy stored may later be utilized for example the propulsion of the vehicle. By using a planetary gearing to interconnect the output shaft of the combustion engine, the rotor of the electric machine and the input shaft of the gearbox a number of advantages with respect to a conventional clutch mechanism may be obtained.

A possibility to an improved behavior in a number of operation situations is obtained by providing such a vehicle with a power assembly configuration also having a second electric machine with respect to vehicles with drive system without such a design of the power assembly configuration. Such an operation situation is when the vehicle is driven with said first locking means in the locking position and a gear shifting is to be carried out.

An example of a power assembly configuration that can be used with the disclosed method is a power assembly configuration configured to provide power for the propulsion of the vehicle, said power assembly configuration comprising a planetary gearing comprising three components in the form of a sun gear, a ring gear and a planetary gears carrier, an input shaft of the planetary gearing being connected to a first of said components of the planetary gearing so that a rotation of this shaft results in a rotation of this component, an output shaft of the planetary gearing constituting an input shaft of a gearbox for transmitting a torque for the propulsion of the vehicle being connected to a second of said components of the planetary gearing so that a rotation of this output shaft results in a rotation of this component, said power assembly configuration comprises a first electric machine with a stator and a rotor connected to a third of said components of the planetary gearing so that rotation of the rotor results in a rotation of this component and a combustion engine with an output shaft connected to said input shaft of the planetary gearing, said drive system further comprising a locking means transferable between a locking position in which two of said components are interlocked so that said three components rotate with the same rotation speed and a releasing position in which said components are allowed to rotate with different rotation speeds, said power assembly configuration also comprises a second electric machine with a stator and a rotor connected to said first component and electrically connected to said first electric machine without any means for storing electric energy included in said power assembly configuration, that the method comprises the below steps a)-e) for carrying out shifting from a present gear to a new gear in the gearbox when driving the vehicle with said locking means in said locking position, and that said second electric machine is during said steps of the method subjected to a voltage control by being controlled to deliver a torque on the input shaft of the planetary gearing for maintaining a determined voltage on a DC link interconnecting two inverters each connecting to a respective of said two electric machines An energy and time saving shifting may be obtained by carrying out the method of:

a) controlling the power assembly configuration to decrease the torque applied on said input shaft of the gearbox to decrease towards zero and to obtain torque balance in the planetary gearing, in which said second electric machine is controlled to operate as a generator and apply a negative torque on said first component and the first electric machine to operate as a motor when gear shifting while driving the vehicle with a positive torque in the drive train and conversely when gear shifting while braking the vehicle through the combustion engine;

b) upon obtaining torque balance in the planetary gearing, transferring said locking means to said releasing position and starting to control the combustion engine towards a rotation speed of the output shaft thereof to be a target rotation speed of said new gear to be shifted to and continue said control of the torque applied by the second electric machine for assisting the output shaft of the combustion engine to reaching the target rotation speed;

c) disengaging said present gear of the gearbox when the torque on said input shaft of the gearbox reaches zero and starting to control said power assembly configuration, for controlling the rotation speed of said input shaft of the gearbox towards said target rotation speed of said new gear, to apply a torque to said input shaft through the first electric machine being one of 1) negative when said new gear is higher than said present gear and the second electric machine to operate as motor and apply a positive torque to said first component and 2) positive when said new gear is lower than said present gear and the second electric machine to operate as a gator and apply a negative torque to said first component;

d) when the rotation speed of said input shaft of the gearbox reaches said target rotation speed, engaging said new gear, controlling the power assembly configuration to increase the torque on said input shaft of the gearbox while maintaining torque balance in the planetary gearing and continuing to control the output shaft of the combustion engine towards said target rotation speed of the input shaft of the gearbox, in which the first electric machine is controlled to operate as motor and by that said second electric machine as generator when gear shifting while driving the vehicle with a positive torque in the drive train and conversely when gear shifting while braking the vehicle; and e) upon obtaining said target rotation speed of the input shaft of the planetary gearing transferring said locking means to the locking position and continuing to control the power assembly configuration to increase the torque applied on said input shaft of the gearbox while controlling the power assembly configuration to deliver a torque desired for the propulsion of the vehicle.

The gear shifting procedure will also be robust with respect to torque deviations or variations in the combustion engine, since this is disconnected thanks to the releasing of the planetary gearing locking means. By subjecting the second electric machine to a voltage control for maintaining a determined voltage on said DC link interconnecting the inverters for exchange of electric energy with the respective electric machine the drive system of the vehicle may have a favorable operation in different operation situations without any need of means for storing electric energy, such as electric batteries. One of the electric machines has always to operate as generator and then normally the other as motor. However, it is possible to have electric equipment of the vehicle connected to receive electric energy from any of the electric machines when desired and possible so that in fact said other electric machine may then also act as generator. Thus, when said that an electric machine operates as motor in this disclosure (also in the claims) this is to be interpreted as covering also an operation of this electric machine in the situation defined as a generator if electric equipment of the vehicle request a certain amount of electric power.

According to an embodiment of the invention when the method is carried out for gear shifting to a new gear being higher than said present gear a member is controlled to apply a negative torque to the combustion engine for assisting the output shaft of the combustion engine to reaching the target rotation speed in step c). Such a member controlled to apply a negative torque to the combustion engine in step c) may be an exhaust gas brake, a VGT (Variable Geometry Turbocharger), a compression brake, a valve control unit or an inlet air throttle. Such a member is controlled for counteracting the positive torque which has to be delivered by the second electric machine, since the first electric machine will operate as generator for reducing the rotation speed of the third component of the planetary gearing in step c).

According to another embodiment of the invention when the gear shifting is carried out to a new gear being lower than said present gear a positive torque is applied on the combustion engine in step c) for counteracting the negative torque applied on said first component by the second electric machine and assisting the output shaft of the combustion engine to reaching the target rotation speed. The positive torque applied on the combustion engine may according to another embodiment of the invention be obtained by increasing the injection of fuel into the combustion engine.

According to another embodiment of the invention when the gear shifting is carried out while accelerating the vehicle and from a present gear to a lower gear injection of fuel into the combustion engine is increased in step e) for compensating for the negative torque applied by said second machine and assisting the output shaft of the combustion engine to reaching the target rotation speed.

According to another embodiment of the invention when the gear shifting is carried out by braking the vehicle and from a present gear to a higher gear a negative torque is in step d) applied on the combustion engine through a member, such as an exhaust gas brake or a VGT, for compensating for the positive torque applied by the second electric machine and assisting the output shaft of the combustion engine to reaching the target rotation speed.

According to another embodiment of the invention when gear shifting is carried out while driving the vehicle with a positive torque in the drive train the power assembly configuration is in step e) controlled to deliver a torque desired for the propulsion of the vehicle by controlling the combustion engine, the first electric machine and the second electric machine to deliver this torque.

According to another embodiment of the invention when gear shifting is carried out while braking the vehicle the control of the power assembly configuration to deliver a torque desired for the propulsion of the vehicle in step e) is carried out by controlling the combustion engine, said first electric machine and the second electric machine to deliver torques of desired values.

According to another embodiment of the invention the method is carried out on a vehicle having a said drive system with the sun gear of the planetary gearing as said first component and the ring gear as said third component. A compact structure easy to fit into spaces already existing for drive trains with clutch mechanisms instead of planetary gearing may be obtained by connecting the rotor of the first electric machine with the ring gear and the output shaft of the combustion engine with the sun gear. A gearbox for a hybrid vehicle may by this be made compact and not substantially more space demanding than a standard gearbox. This means that the weight increase normally caused by a hybrid construction may be considerably reduced.

Other advantageous features as well as advantages of the present invention appear from the description following below.

BRIEF DESCRIPTION OF THE DRAWINGS

With reference to the appended drawings, below follows a specific description of embodiments of the invention cited as examples. In the drawings.

DETAILED DESCRIPTION OF THE INVENTION

Figure 1:
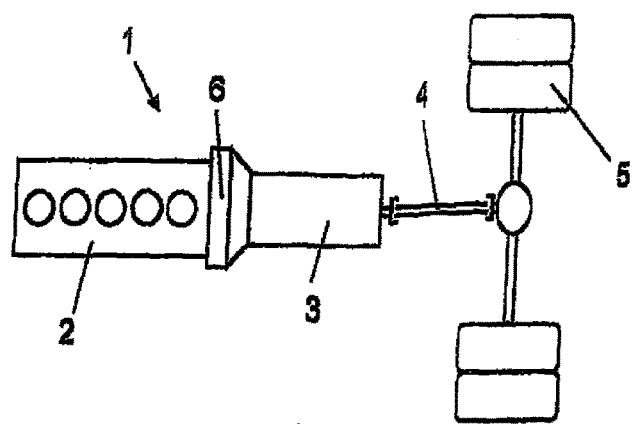
FIG. 1 illustrates very schematically a drive train of a vehicle which may be provided with a drive system for carrying out a method according to the invention.
Figure 2:
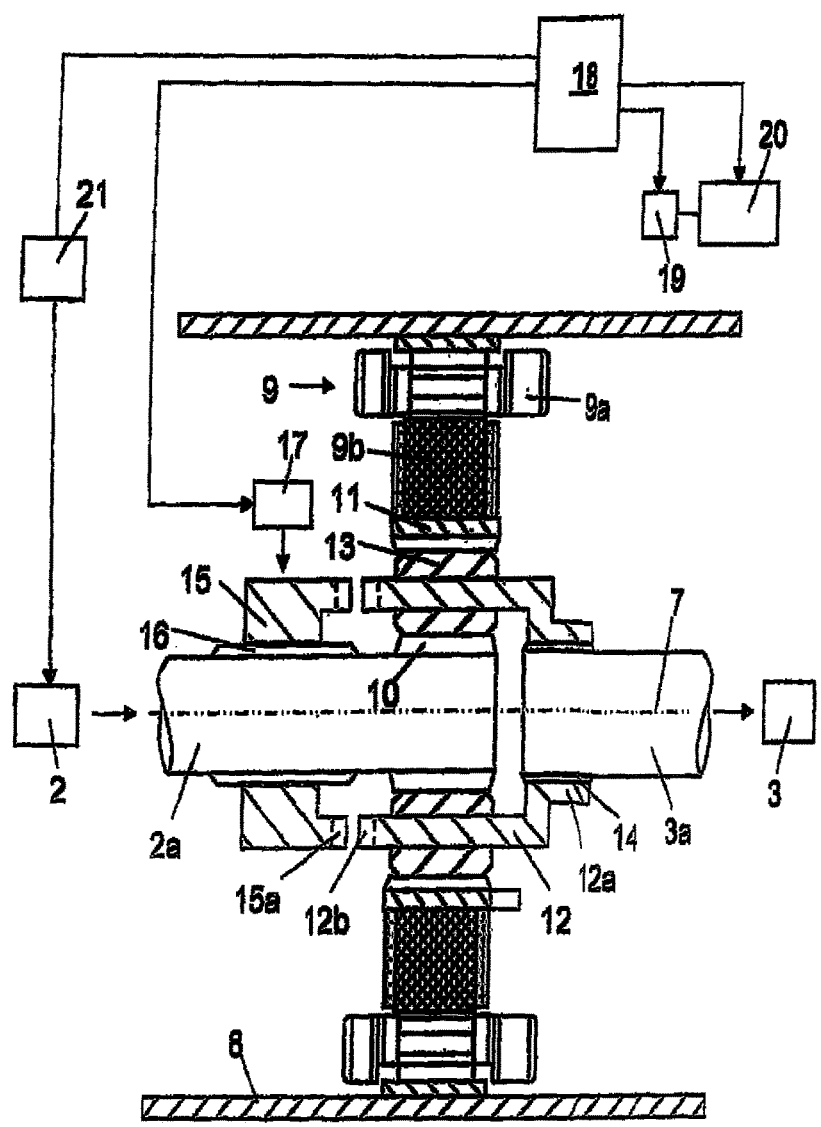
FIG. 2 is a more detailed but still simplified view of a part of said drive system.

FIG. 1 shows a drive train for a heavy vehicle 1. The drive train comprises a combustion engine 2, a gearbox 3 and a number of drive shafts 4 and drive wheels 5. The drive train has an intermediate portion 6 located between the combustion engine 2 and the gearbox 3. FIG. 2 shows a part of the components in said intermediate portion 6 more in detail, namely those which are also present in drive systems of the type defined in the introduction already known, such as through SE 536 329. The combustion engine 2 is provided with an output shaft 2a and the gearbox 3 with an input shaft 3a in the intermediate portion 6. The output shaft 2a of the combustion engine is arranged coaxially with respect to the input shaft 3a of the gearbox. The output shaft 2a of the combustion engine and the input shaft 3a of the gearbox rotate around a rotation axis 7 in common. The intermediate portion 6 comprises a housing 8 enclosing an electric machine 9 and a planetary gearing. The electric machine 9 comprises a stator 9a and a rotor 9b. The stator 9a comprises a stator core secured to the inner wall of the housing 8. The stator core comprises the windings of the stator. The first electric machine 9 is configured to under certain operation states utilize electric energy stored so as to supply driving force to the input shaft 3a of the gearbox and during other operation states utilize kinetic energy of the input shaft 3a of the gearbox to produce and store electric energy.

The planetary gearing is arranged substantially radially internally of the stator 9a and the rotor 9b of the electric machine. The planetary gearing comprises a sun gear 10, a ring gear 11 and a planetary gears carrier 12. The planetary gears carrier 12 carries a number of gears 13 arranged to rotate in a radial space between the sun gear 10 and the teeth of the ring gear 11. The sun gear 10 is here secured to a peripheral surface of the output shaft 2a of the combustion engine. The sun gear 10 and the output shaft 2a of the combustion engine rotate as a unit with a first number of revolutions $n_1$. The planetary gears carrier 12 comprises a securing portion 12a secured to a peripheral surface of the input shaft 3a of the gearbox by means of a splines joint 14. The planetary gears carrier 12 and the input shaft 3a of the gearbox may by means of this joint rotate as a unit with a second number of revolutions $n_2$. The ring gear 11 comprises an external peripheral surface onto which the rotor 9b is secured. The rotor 9b and the ring gear 11 form a rotatable unit rotating with a third number of revolutions $n_3$.

The drive system comprises further a locking means by the fact that the output shaft 2a of the combustion engine is provided with a displaceable coupling member 15. The coupling member 15 is secured to the output shaft 2a of the combustion engine by means of a splines joint 16. The coupling member 15 is in this case secured against rotation on the output shaft 2a of the combustion engine and displaceable in an axial direction on this output shaft 2a. The coupling member 15 comprises a coupling portion 15a which is connected to a coupling portion 12b of the planetary gears carrier 12. A displacing member 17 schematically shown is arranged to displace the coupling member 15 between a first position in which the coupling portions 15a, 12b are not in mutual engagement corresponding to a releasing position of the locking means and a second position in which the coupling portions 15a, 12b are in mutual engagement corresponding to a locking position of the locking means. The output shaft 2a of the combustion engine and the input shaft 3a of the gearbox will in this locking position be interlocked and they and by that also the rotor of the electric machine will rotate with the same number of revolutions. This state may be called locked planet. The locking mechanism may also have any other construction, such as the one disclosed in the Swedish patent application 1250696-0. The locking means may also be formed by any suitable type of friction coupling or clutch.

An electronic control unit 18 is configured to control the displacing member 17. The control unit 18 is also configured to decide on which occasions the electric machine shall function as a motor and on which occasions it shall function as a generator. The control unit 18 may receive information about suitable operation parameters for deciding which function is to be chosen. The control unit 18 may be a computer with software for this task. The control unit 18 controls a regulating equipment 19 schematically indicated which regulates the flow of electric energy between a hybrid battery 20 and the stator windings 9a of the electric machine. When the electric machine 9 operates as motor electric energy stored in the hybrid battery 20 is supplied to the stator 9a. When the electric machine operates as generator electric energy is supplied to the hybrid battery 20 from the stator 9a. The hybrid battery 20 delivers and stores electric energy having a voltage in the order of 300-900 V. It is important that the electric machine 9 and the planetary gearing constitute a compact unit, since the intermediate portion 6 between the combustion engine 2 and the gearbox 3 in a vehicle is restricted. The components 10, 11, 12 of the planetary gearing are arranged substantially radially internally of the stator 9a of the electric machine. The rotor 9b of the electric machine, the ring gear 11 of the planetary gearing, the output shaft 2a of the combustion engine and the input shaft 3a of the gearbox are here arranged to rotate around a rotation axis 7 in common. Such a design means that the electric machine 9 and the planetary gearing require comparatively little space. The vehicle 1 is provided with an engine control function 21 through which the number of revolutions $n_1$ of the combustion engine 2 is controlled. The drive system may of course instead of being controlled by one single control unit 18 be controlled by several different control units.

Figure 3:
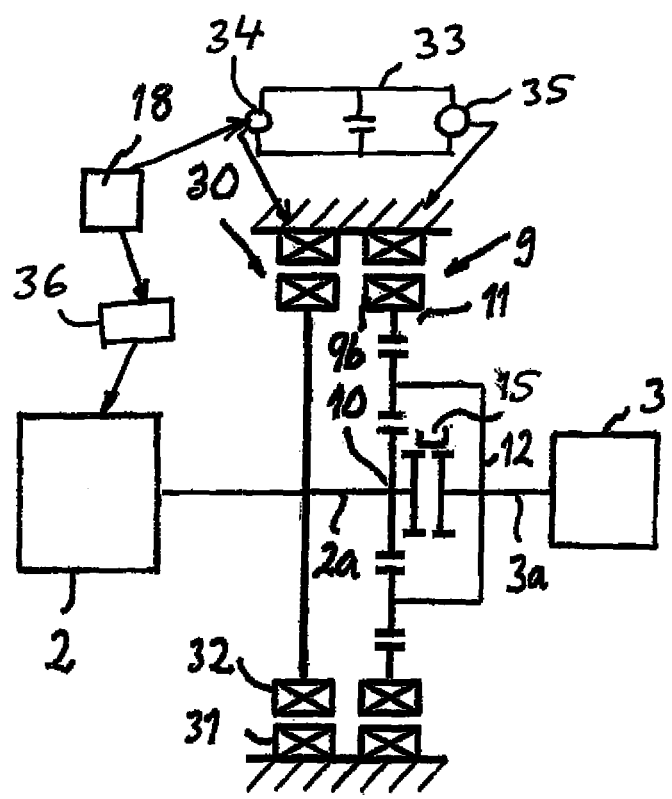
FIG. 3 is a simplified view illustrating the general construction of a drive system for carrying out a method according to the invention.

A drive system to which a method according to the invention may be carried out is shown in FIG. 3. This drive system differs from that shown in FIG. 2 by including a second electric machine 30 and having no electric battery or other means for storing electric energy. The second electric machine has a stator 31 with stator windings and a rotor 32 connected to the output shaft 2a of the combustion engine. In spite of the lack of electric energy storing means in the power assembly configuration of the drive system all driving modes of the vehicle possible for a hybrid drive system, i.e. with electric energy storing means, may be carried out except for purely electrical driving and regeneration of electric energy when braking. All these driving modes may be obtained by carrying out a voltage control of the second electric machine 30 taken care of by the electronic control unit 18 so as to maintain a desired level of the voltage on an intermediate direct voltage link (DC-link) 33 providing a voltage to be fed to the two inverters 34, 35 to be controlled by the control unit 18 for feeding electric energy to or from the respective electric machine 30 and 9, respectively. A said voltage control of the second electric machine 30 means that the inverter 34 connected thereto is controlled to request a voltage to be maintained and it will by that control the torque of the second electric machine 30 so that the voltage requested is maintained on the direct voltage side of the inverter. The control unit 18 is also configured to control supply of fuel to the combustion engine 2. A member, such as an exhaust gas brake or a VGT, for applying a negative torque to the combustion engine is indicated by the box 36 and is also controlled by the control unit 18.

Figure 4:
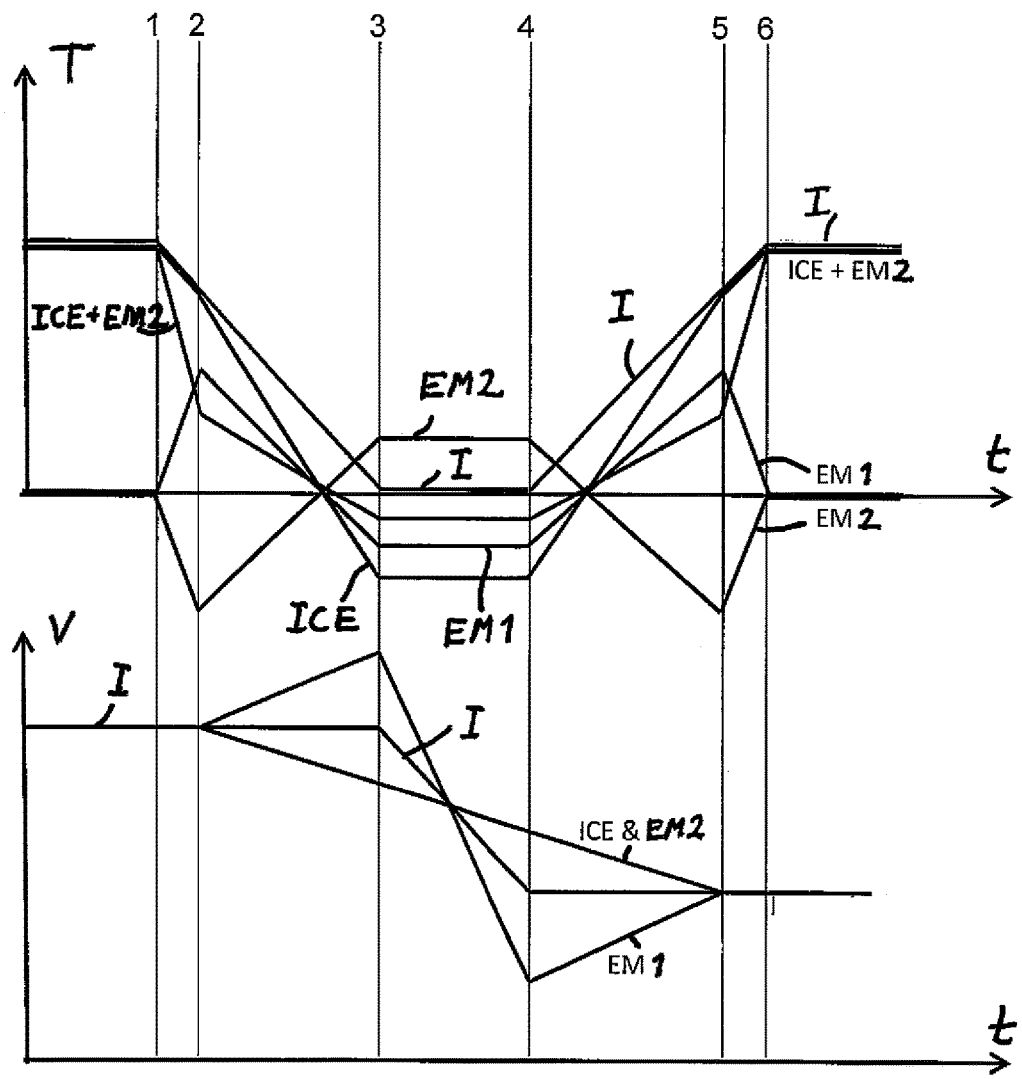
FIG. 4 shows graphs of the torque T and rotation speed v, respectively, versus time t of the input shaft of the gearbox I, the output shaft of the combustion engine with rotor of the second electric machine ICE+EM2 and the rotor of the first electric machine EM1 when carrying out a gear shifting procedure to a higher gear while driving the vehicle with a positive torque in the drive train in a method according to an embodiment of the invention.

A method according to an embodiment of the invention for shifting from a present gear to a new higher gear, i.e. with a higher rotation speed of an output shaft of the gearbox for a certain rotation speed of the input shaft of the gearbox, in the gearbox while driving a vehicle having a drive system of the type shown in FIG. 3 with a positive torque in the drive train will now be described while making reference to FIG. 4. The times t for starting the different steps of the procedure are indicated by 1-5 and the following will be carried out at these times:

1. The power assembly configuration is controlled to decrease the torque T applied on the input shaft I of the gearbox to decrease towards zero and to obtain torque balance in the planetary gearing, in which the second electric machine EM2 is controlled to operate as a generator and apply a negative torque on the first component (sun gear) and the first electric machine EM1 to operate as a motor.

2. Upon obtaining a torque balance in the planetary gearing the locking means 15 is transferred to the releasing position, and it is started to control the combustion engine ICE towards a rotation speed of the output shaft thereof to be a target rotation speed of said new gear to be shifted to and the control of the torque applied by the second electric machine EM2 for assisting the output shaft of the combustion engine to reaching the target rotation speed is continued.

3. The present gear of the gearbox is disengaged when the torque on said input shaft I of the gearbox reaches zero, and it is started to control the power assembly configuration, for controlling the rotation speed of the input shaft I of the gearbox towards the target rotation speed of the new gear, to apply a torque to this input shaft through the first electric machine EM1 being negative and the second electric machine EM2 to operate as motor and apply a positive torque to the first component (sun gear) when it has not to deliver electric power to any said electric equipment and acting as generator too. A negative torque is applied to the combustion engine by controlling for example an exhaust gas brake or a VGT for counteracting the positive torque applied through the second electric machine and reducing the rotation speed of the combustion engine.

4. When the rotation speed v of the input shaft I of the gearbox reaches said target rotation speed the new gear is engaged. the power assembly configuration is controlled to increase the torque on the input shaft of the gearbox while maintaining torque balance in the planetary gearing and continuing to control the output shaft of the combustion engine towards said target rotation speed of the input shaft of the gearbox, in which the first electric machine EM1 is controlled to operate as motor and by that the second electric machine EM2 as generator.

5. When said target rotation speed is obtained by the input shaft ICE & EM2 of the planetary gearing the locking means 15 is transferred to the locking position, and the combustion engine ICE the first electric machine EM1 and the second electric machine EM2 are controlled to the torque desires for the propulsion of the vehicle. The method is ended when reaching the time 6.

Figure 5:
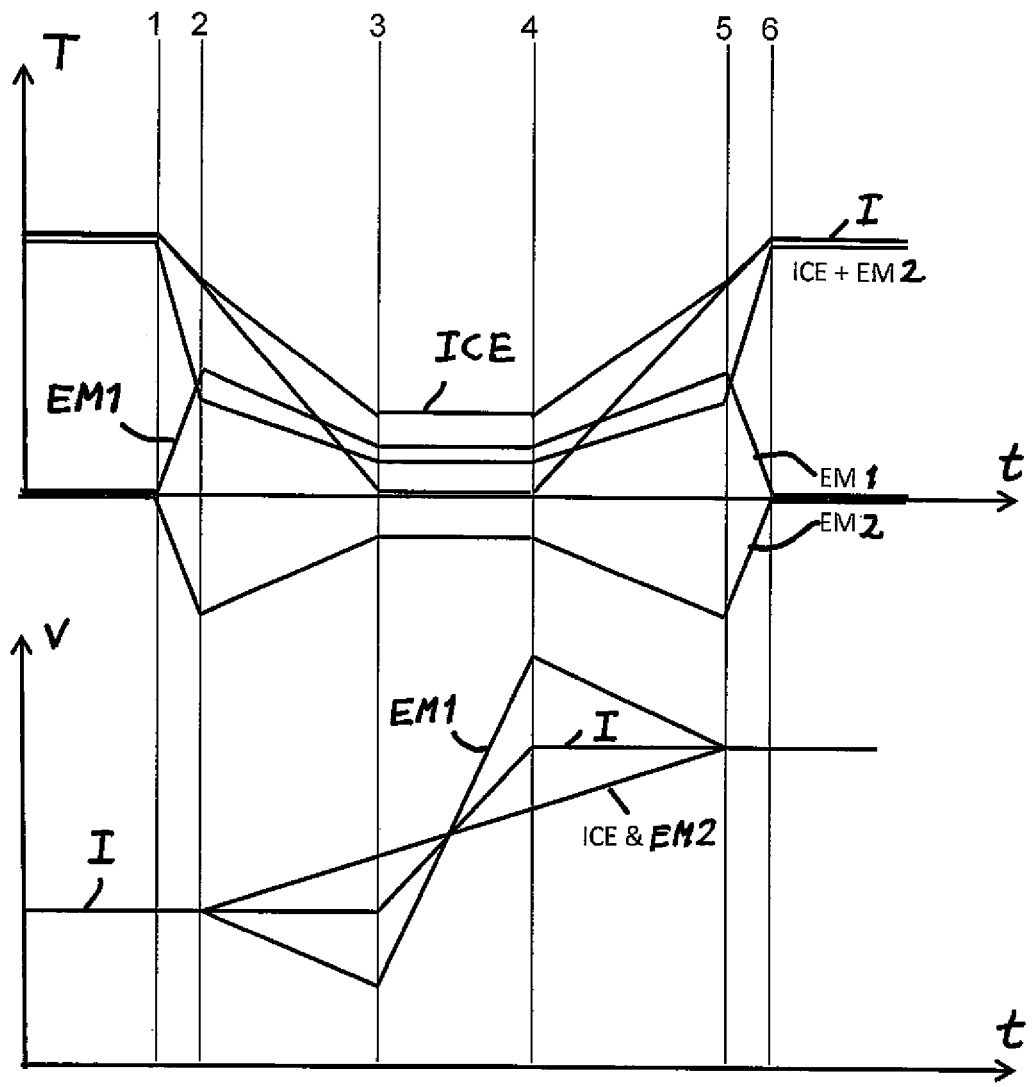
FIG. 5 shows graphs of the torque and rotation speed, respectively, versus time of the input shaft of the gearbox, the output shaft of the combustion engine with rotor of the second electric machine and the rotor of the first electric machine when carrying out a gear shifting procedure to a lower gear while driving the vehicle with a positive torque in the drive train in a method according to an embodiment of the invention.
Figure 6:
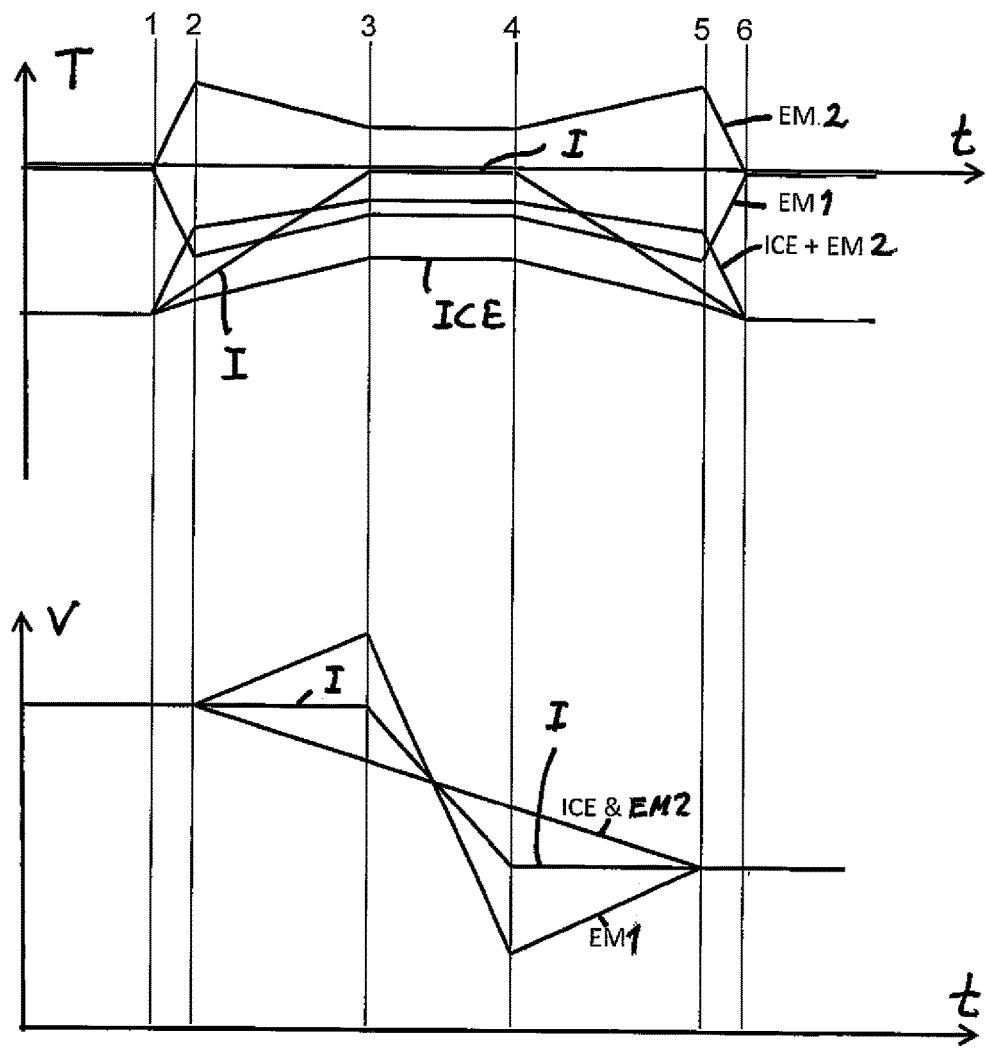
FIG. 6 shows graphs of the torque and rotation speed, respectively, versus time of the input shaft of the gearbox, the output shaft of the combustion engine with rotor of the second electric machine and the rotor of the first electric machine when carrying out a gear shifting procedure to a higher gear while braking the vehicle in a method according to an embodiment of the invention.
Figure 7:
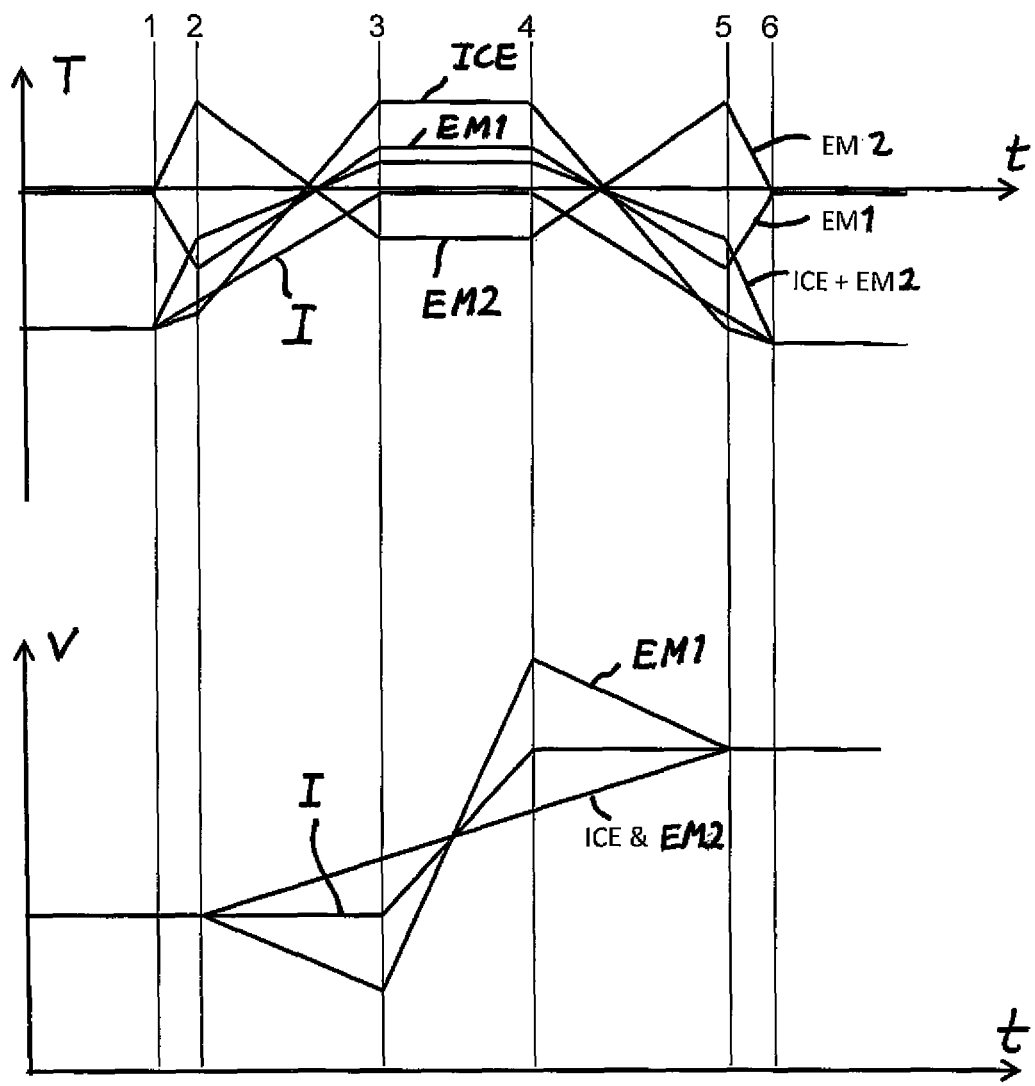
FIG. 7 shows graphs of the torque and rotation speed, respectively, versus time of the input shaft of the gearbox, the output shaft of the combustion engine with rotor of the second electric machine and the rotor of the first electric machine when carrying out a gear shifting procedure to a lower gear while braking the vehicle in a method according to an embodiment of the invention.

FIGS. 5, 6 and 7 illustrate the development of torques T and rotation speeds v when carrying out the method now disclosed for shifting to a lower gear while driving the vehicle with a positive torque in the drive train, shifting to a higher gear while braking the vehicle and shifting to a lower gear while braking the vehicle, respectively. The main difference with respect to the method disclosed with reference to FIG. 4 is that when reaching the time 1 the second electric machine is controlled to operate as motor and the first electric machine as generator when gear shifting while braking the vehicle through the combustion engine. When reaching the time 3 the torque applied to the input shaft of the gearbox through the first electric machine will be positive when the new gear is lower than the present gear and the second electric machine will then operate as a generator and apply a negative torque to the first component. When reaching the time 4 the first electric machine will be controlled to operate as generator and by that the second electric machine as motor when gear shifting while braking the vehicle.

Figure 8:
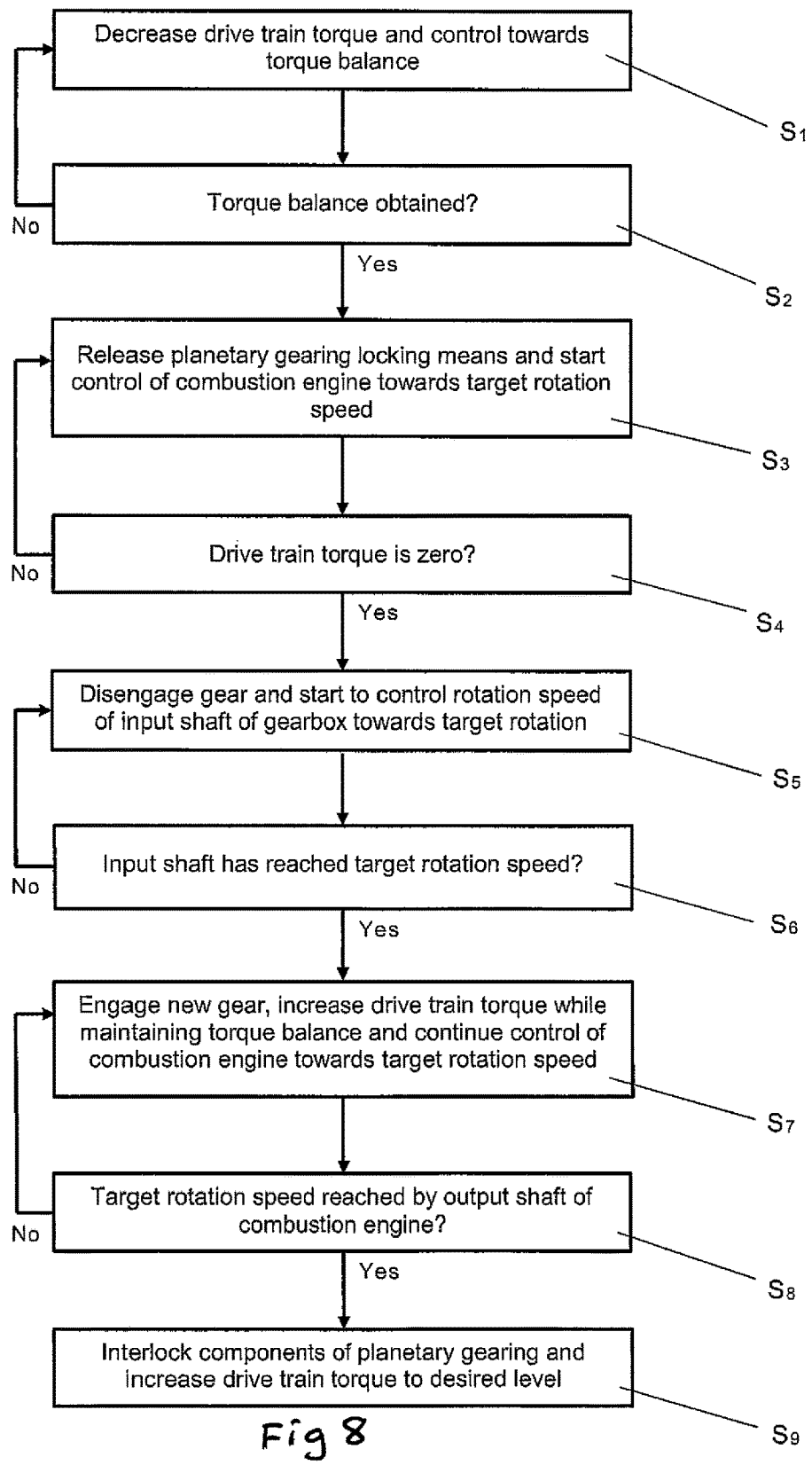
FIG. 8 is a flow chart illustrating the steps carried out in a method according to an embodiment of the invention.

FIG. 8 illustrates a flow chart of a method according to an embodiment of the present invention carried out for a vehicle with a drive system of the type shown in FIG. 3. It is assumed that the vehicle is driven with the locking means 15 in the locking position. The method is started with the step $S_1$ of decreasing the drive train torque and controlling torques towards balance in the planetary gearing. In a subsequent step $S_2$ the question is asked whether torque balance is obtained. When the answer to this question is "yes" it is continued to step $S_3$ of releasing the planetary gearing locking means and starting to control the combustion engine towards a target rotation speed of the input shaft of the gearbox for the new gear to be shifted to. It is then in a step $S_4$ asked whether the drive train torque is zero, and if the answer to this question is "yes" it is proceeded to step $S_5$ for disengaging the present gear and starting to control the rotation speed of the input shaft of the gearbox towards said target rotation speed. In a subsequent step $S_6$ it is asked whether the input shaft of the gearbox has reached target rotation speed, and if the answer to this question is "yes" the new gear is engaged in a step S7, and the drive train torque is increased while maintaining torque balance and it is continued to control the combustion engine towards said target rotation speed. In a step $S_8$ it is asked whether the target rotation speed has been reached by the output shaft of the combustion engine, and when the answer to this question is "yes" the components of the planetary gearing are interlocked and the drive train torque is increased to a desired level, whereupon the gear shifting procedure is completed. Which of the two electric machines is operated as motor (or as generator when requested) and which as generator in the steps S1, S3, S5 and S7 is depending upon whether gear shifting is to be carried out to a higher or a lower gear and whether gear shifting is to be carried out while accelerating or braking the vehicle.

Figure 9:
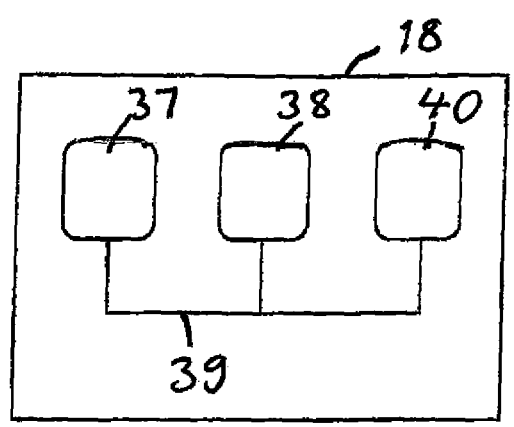
FIG. 9 is a schematic view illustrating an electronic control unit for implementing a method according to the invention.

Computer program code for implementing a method according to the invention is with advantage included in a computer program which can be read into the internal memory of a computer, e.g. the internal memory of an electronic control unit of a motor vehicle. Such a computer program is with advantage provided via a computer program product comprising a data storage medium which can be read by a computer and which has the computer program stored on it. Said data storage medium is for example an optical data storage medium in the form of a CD ROM disc, a DVD disc etc., a magnetic data storage medium in the form of a hard disc, a diskette, a cassette tape etc., or a flash memory or a memory of the ROM, PROM, EPROM or EEPROM type. FIG. 9 illustrates very schematically an electronic control unit 18 comprising an execution means 37, e.g. a central processor unit (CPU), for execution of computer software. The execution means 37 communicates with a memory 38, e.g. of the RAM type, via a data bus 39. The control unit 18 comprises also a non-transitory data storage medium 40, e.g. in the form of a flash memory or a memory of the ROM, PROM, EPROM or EEPROM type. The execution means 37 communicates with the data storage medium 40 via the data bus 39. A computer program comprising computer program code for implementing a method according to the invention, e.g. in accordance with the embodiment illustrated in FIG. 8 is stored on the data storage medium 40.

The invention is of course in no way restricted to the embodiments described above, since many possibilities for modifications thereof are likely to be obvious to one skilled in the art without having to deviate from the scope of invention defined in the appended claims.

The method according to the invention may also be carried out in a vehicle having a drive system with a ring gear of the planetary gearing as said first component and the sun gear as said third component, which means that the rotor of the first electric machine would be connected to the sun gear of the planetary gearing and the rotor of the second electric machine and the combustion engine would be connected to the ring gear of the planetary gearing instead of to the sun gear. However, the output shaft of the planetary gearing for transmitting torque for the propulsion of the vehicle is preferably connected to the planetary gears carrier.

Torque balance in the planetary gearing is defined as a state when a torque acts on a ring gear of the planetary gearing, which corresponds to the product of the torque acting on the planetary gears carrier of the planetary gearing and the transmission ratio of the planetary gearing at the same time as a torque acts on the sun gear of the planetary gearing, which corresponds to the product of the torque acting upon the planetary gears carrier and (1—the transmission ratio of the planetary gearing). At such a torque balance the planetary gearing locking means will not transfer any torque between the components of the planetary gearing.

"Without any means for storing electric energy included in the power assembly configuration" is in this disclosure to be interpreted to also cover that means for storing electric energy insignificant in this context are present, such as capacitors for stablizing the voltage in the intermediate DC-link interconnecting said inverters.

The invention claimed is:

1. A method for controlling a vehicle with a drive system comprising a power assembly configuration configured to provide power for the propulsion of the vehicle, said power assembly configuration comprising a planetary gearing comprising three components in the form of a sun gear, a ring gear and a planetary gears carrier, an input shaft of the planetary gearing being connected to a first of said components of the planetary gearing so that a rotation of this shaft results in a rotation of this component, an output shaft of the planetary gearing constituting an input shaft of a gearbox for transmitting a torque for the propulsion of the vehicle being connected to a second of said components of the planetary gearing so that a rotation of this output shaft results in a rotation of this component, said power assembly configuration comprises a first electric machine with a stator and a rotor connected to a third of said components of the planetary gearing so that rotation of the rotor results in a rotation of this component and a combustion engine with an output shaft connected to said input shaft of the planetary gearing, said drive system further comprising a locking means transferable between a locking position in which two of said components are interlocked so that said three components rotate with the same rotation speed and a releasing position in which said components are allowed to rotate with different rotation speeds, said power assembly configuration also comprises a second electric machine with a stator and a rotor connected to said first component and electrically connected to said first electric machine without any means for storing electric energy included in said power assembly configuration, that the method comprises the below steps a)-e) for carrying out shifting from a present gear to a new gear in the gearbox when driving the vehicle with said locking means in said locking position, and that said second electric machine is during said steps of the method subjected to a voltage control by being controlled to deliver a torque on the input shaft of the planetary gearing for maintaining a determined voltage on a DC link interconnecting two inverters each connecting to a respective of said two electric machines, said method comprising:

a) controlling the power assembly configuration to decrease the torque applied on said input shaft of the gearbox to decrease towards zero and to obtain torque balance in the planetary gearing, in which said second electric machine is controlled to operate as a generator and apply a negative torque on said first component and the first electric machine to operate as a motor when gear shifting while driving the vehicle with a positive torque in the drive train and conversely when gear shifting while braking the vehicle through the combustion engine;

b) upon obtaining torque balance in the planetary gearing, transferring said locking means to said releasing position and starting to control the combustion engine towards a rotation speed of the output shaft thereof to be a target rotation speed of said new gear to be shifted to and continue said control of the torque applied by the second electric machine for assisting the output shaft of the combustion engine to reaching the target rotation speed;

c) disengaging said present gear of the gearbox when the torque on said input shaft of the gearbox reaches zero and starting to control said power assembly configuration, for controlling the rotation speed of said input shaft of the gearbox towards said target rotation speed of said new gear, to apply a torque to said input shaft through the first electric machine being one of 1)

negative when said new gear is higher than said present gear and the second electric machine to operate as motor and apply a positive torque to said first component and 2) positive when said new gear is lower than said present gear and the second electric machine to operate as a generator and apply a negative torque to said first component;

d) when the rotation speed of said input shaft of the gearbox reaches said target rotation speed, engaging said new gear, controlling the power assembly configuration to increase the torque on said input shaft of the gearbox while maintaining torque balance in the planetary gearing and continuing to control the output shaft of the combustion engine towards said target rotation speed of the input shaft of the gearbox, in which the first electric machine is controlled to operate as motor and by that said second electric machine as generator when gear shifting while driving the vehicle with a positive torque in the drive train and conversely when gear shifting while braking the vehicle; and e) upon obtaining said target rotation speed of the input shaft of the planetary gearing transferring said locking means to the locking position and continuing to control the power assembly configuration to increase the torque applied on said input shaft of the gearbox while controlling the power assembly configuration to deliver a torque desired for the propulsion of the vehicle.

2. A method according to claim 1, wherein when the method is carried out for gear shifting to a new gear being higher than said present gear a member (36) is controlled to apply a negative torque to the combustion engine for assisting the output shaft of the combustion engine to reaching the target rotation speed in step c).

3. A method according to claim 2, wherein said member (36) controlled to apply a negative torque to the combustion engine in step c) is an exhaust gas brake a VGT, a compression brake, a valve control unit or an inlet air throttle.

4. A method according to claim 1, wherein when the gear shifting is carried out to a new gear being lower than said present gear a positive torque is applied on the combustion engine in step c) for counteracting the negative torque applied on said first component by the second electric machine and assisting the output shaft of the combustion engine to reaching the target rotation speed.

5. A method according to claim 4, wherein in step c) said additional positive torque is applied to the combustion engine by increasing the injection of fuel into the combustion engine.

6. A method according to claim 1, wherein when the gear shifting is carried out while accelerating the vehicle and from a present gear to a lower gear injection of fuel into the combustion engine is increased in step d) for compensating for the negative torque applied by said second electric machine and assisting the output shaft of the combustion engine to reaching the target rotation speed.

7. A method according to claim 1, wherein when the gear shifting is carried out while braking the vehicle and from a present gear to a higher gear a negative torque is in step d) applied on the combustion engine through a member, such as an exhaust gas brake or a VGT, for compensating for the positive torque applied by the second electric machine and assisting the output shaft of the combustion engine to reaching the target rotation speed.

8. A method according to claim 1, wherein when gear shifting is carried out while driving the vehicle with a positive torque in the drive train the power assembly configuration is in step e) controlled to deliver a torque desired for the propulsion of the vehicle by controlling the combustion engine, the first electric machine and the second electric machine to deliver this torque.

9. A method according to claim 1, wherein when gear shifting is carried out while braking the vehicle the control of the power assembly configuration to deliver a torque desired for the propulsion of the vehicle in step e) is carried out by controlling the combustion engine, said first electric machine and the second electric machine to deliver torques of desired values.

10. A method according to claim 1, wherein the method is carried out on a vehicle having a said drive system with the sun gear of the planetary gearing as said first component and the ring gear as said third component.

11. A computer program product comprising a program code stored on a non-transitory data storage medium for controlling a vehicle with a drive system comprising a power assembly configuration configured to provide power for the propulsion of the vehicle, said power assembly configuration comprising a planetary gearing comprising three components in the form of a sun gear, a ring gear and a planetary gears carrier, an input shaft of the planetary gearing being connected to a first of said components of the planetary gearing so that a rotation of this shaft results in a rotation of this component, an output shaft of the planetary gearing constituting an input shaft of a gearbox for transmitting a torque for the propulsion of the vehicle being connected to a second of said components of the planetary gearing so that a rotation of this output shaft results in a rotation of this component, said power assembly configuration comprises a first electric machine with a stator and a rotor connected to a third of said components of the planetary gearing so that rotation of the rotor results in a rotation of this component and a combustion engine with an output shaft connected to said input shaft of the planetary gearing, said drive system further comprising a locking means transferable between a locking position in which two of said components are interlocked so that said three components rotate with the same rotation speed and a releasing position in which said components are allowed to rotate with different rotation speeds, said power assembly configuration also comprises a second electric machine with a stator and a rotor connected to said first component and electrically connected to said first electric machine without any means for storing electric energy included in said power assembly configuration, that the computer program code comprises instructions for performing the below steps a)-e) for carrying out shifting from a present gear to a new gear in the gearbox when driving the vehicle with said locking means in said locking position, and that said second electric machine is during said operations of the computer program code subjected to a voltage control by being controlled to deliver a torque on the input shaft of the planetary gearing for maintaining a determined voltage on a DC link interconnecting two inverters each connecting to a respective of said two electric machines, wherein said computer program code comprising computer instructions to cause one or more computer processors to perform the following operations:

a) controlling the power assembly configuration to decrease the torque applied on said input shaft of the gearbox to decrease towards zero and to obtain torque balance in the planetary gearing, in which said second electric machine is controlled to operate as a generator and apply a negative torque on said first component and the first electric machine to operate as a motor when gear shifting while driving the vehicle with a positive torque in the drive train and conversely when gear shifting while braking the vehicle through the combustion engine;
b) upon obtaining torque balance in the planetary gearing, transferring said locking means to said releasing position and starting to control the combustion engine towards a rotation speed of the output shaft thereof to be a target rotation speed of said new gear to be shifted to and continue said control of the torque applied by the second electric machine for assisting the output shaft of the combustion engine to reaching the target rotation speed;
c) disengaging said present gear of the gearbox when the torque on said input shaft of the gearbox reaches zero and starting to control said power assembly configuration, for controlling the rotation speed of said input shaft of the gearbox towards said target rotation speed of said new gear, to apply a torque to said input shaft through the first electric machine being one of 1) negative when said new gear is higher than said present gear and the second electric machine to operate as motor and apply a positive torque to said first component and positive when said new gear is lower than said present gear and the second electric machine to operate as a generator and apply a negative torque to said first component;
d) when the rotation speed of said input shaft of the gearbox reaches said target rotation speed, engaging said new gear, controlling the power assembly configuration to increase the torque on said input shaft of the gearbox while maintaining torque balance in the planetary gearing and continuing to control the output shaft of the combustion engine towards said target rotation speed of the input shaft of the gearbox, in which the first electric machine is controlled to operate as motor and by that said second electric machine as generator when gear shifting while driving the vehicle with a positive torque in the drive train and conversely when gear shifting while braking the vehicle; and
e) upon obtaining said target rotation speed of the input shaft of the planetary gearing transferring said locking means to the locking position and continuing to control the power assembly configuration to increase the torque applied on said input shaft of the gearbox while controlling the power assembly configuration to deliver a torque desired for the propulsion of the vehicle.

12. An electronic control unit of a motor vehicle comprising an execution means, a memory connected to the execution means and a non-transitory data storage medium which is connected to the execution means and on which a computer program code of a computer program is stored said computer program code for controlling a vehicle with a drive system comprising a power assembly configuration configured to provide power for the propulsion of the vehicle, said power assembly configuration comprising a planetary gearing comprising three components in the form of a sun gear, a ring gear and a planetary gears carrier, an input shaft of the planetary gearing being connected to a first of said components of the planetary gearing so that a rotation of this shaft results in a rotation of this component, an output shaft of the planetary gearing constituting an input shaft of a gearbox for transmitting a torque for the propulsion of the vehicle being connected to a second of said components of the planetary gearing so that a rotation of this output shaft results in a rotation of this component, said power assembly configuration comprises a first electric machine with a stator and a rotor connected to a third of said components of the planetary gearing so that rotation of the rotor results in a rotation of this component and a combustion engine with an output shaft connected to said input shaft of the planetary gearing, said drive system further comprising a locking means transferable between a locking position in which two of said components are interlocked so that said three components rotate with the same rotation speed and a releasing position in which said components are allowed to rotate with different rotation speeds, said power assembly configuration also comprises a second electric machine with a stator and a rotor connected to said first component and electrically connected to said first electric machine without any means for storing electric energy included in said power assembly configuration, that the computer program code comprises instructions for performing the below steps a)-e) for carrying out shifting from a present gear to a new gear in the gearbox when driving the vehicle with said locking means in said locking position, and that said second electric machine is during said operations of the computer program code subjected to a voltage control by being controlled to deliver a torque on the input shaft of the planetary gearing for maintaining a determined voltage on a DC link interconnecting two inverters each connecting to a respective of said two electric machines, wherein said computer program code comprising computer instructions to cause one or more computer processors to perform the following operations:
a) controlling the power assembly configuration to decrease the torque applied on said input shaft of the gearbox to decrease towards zero and to obtain torque balance in the planetary gearing, in which said second electric machine is controlled to operate as a generator and apply a negative torque on said first component and the first electric machine to operate as a motor when gear shifting while driving the vehicle with a positive torque in the drive train and conversely when gear shifting while braking the vehicle through the combustion engine;
b) upon obtaining torque balance in the planetary gearing, transferring said locking means to said releasing position and starting to control the combustion engine towards a rotation speed of the output shaft thereof to be a target rotation speed of said new gear to be shifted to and continue said control of the torque applied by the second electric machine for assisting the output shaft of the combustion engine to reaching the target rotation speed;
c) disengaging said present gear of the gearbox when the torque on said input shaft of the gearbox reaches zero and starting to control said power assembly configuration, for controlling the rotation speed of said input shaft of the gearbox towards said target rotation speed of said new gear, to apply a torque to said input shaft through the first electric machine being one of 1) negative when said new gear is higher than said present gear and the second electric machine to operate as motor and apply a positive torque to said first component and 2) positive when said new gear is lower than said present gear and the second electric machine to operate as a generator and apply a negative torque to said first component;
d) when the rotation speed of said input shaft of the gearbox reaches said target rotation speed, engaging said new gear, controlling the power assembly configuration to increase the torque on said input shaft of the gearbox while maintaining torque balance in the planetary gearing and continuing to control the output shaft of the combustion engine towards said target rotation speed of the input shaft of the gearbox, in which the first electric machine is controlled to operate as motor and by that said second electric machine as generator when gear shifting while driving the vehicle with a positive torque in the drive train and conversely when gear shifting while braking the vehicle; and e) upon obtaining said target rotation speed of the input shaft of the planetary gearing transferring said locking means to the locking position and continuing to control the power assembly configuration to increase the torque applied on said input shaft of the gearbox while controlling the power assembly configuration to deliver a torque desired for the propulsion of the vehicle.

\* \* \* \* \*

UNITED STATES PATENT AND TRADEMARK OFFICE
CERTIFICATE OF CORRECTION

PATENT NO. : 10,239,513 B2
APPLICATION NO. : 15/735077
DATED : March 26, 2019
INVENTOR(S) : Johan Lindström et al.

Page 1 of 1

It is certified that error appears in the above-identified patent and that said Letters Patent is hereby corrected as shown below:

On the Title Page

Item [73] change to:
Scania CV AB, Södertälje (SE)

In the Claims

Column 11, Claim 3, change Line 36 to:
engine in step c) is an exhaust gas brake a VGT (Variable Geometry Turbocharger), a com- Column 13, Claim 11, change Line 23 to:
nent and 2) positive when said new gear is lower than said Signed and Sealed this
Fourth Day of June, 2019

Andrei Iancu
*Director of the United States Patent and Trademark Office*